United States Patent [19]

Clarke et al.

[11] 4,335,219

[45] Jun. 15, 1982

[54] PROCESS FOR REACTING ISOCYANATES IN THE PRESENCE OF QUATERNARY AMMONIUM ZWITTERIONS

[75] Inventors: Donald H. Clarke, Essexville; George J. Pomranky; Donald L. Schmidt, both of Midland, all of Mich.

[73] Assignee: The Dow Chemical Company, Midland, Mich.

[21] Appl. No.: 251,628

[22] Filed: Apr. 6, 1981

[51] Int. Cl.$^3$ .............................................. C08G 18/18
[52] U.S. Cl. ...................................... 521/128; 528/52; 544/193; 560/24; 560/25; 560/26; 560/27; 560/115; 560/157; 560/158; 564/47
[58] Field of Search .......................... 521/128; 528/52; 544/193; 560/24, 25, 26, 27, 115, 157, 158; 564/47, 48, 61

[56] References Cited

U.S. PATENT DOCUMENTS

| | | | |
|---|---|---|---|
| 3,487,080 | 12/1969 | Matsui et al. | 260/248 |
| 3,809,646 | 5/1974 | Spence | 252/8.8 |
| 3,892,687 | 7/1975 | Bechara et al. | 252/426 |
| 4,111,914 | 9/1978 | Kresta et al. | 528/48 |

Primary Examiner—Maurice J. Welsh
Attorney, Agent, or Firm—Michael S. Jenkins

[57] ABSTRACT

The reaction of an isocyanate such as toluene diisocyanate with itself to form an isocyanurate or with an active hydrogen compound such as diethylene glycol to form a urethane is catalyzed by the presence of an ar-ammonium areneoxide such as 4-dodecyl-2-trimethylammonium phenoxide.

12 Claims, No Drawings

PROCESS FOR REACTING ISOCYANATES IN THE PRESENCE OF QUATERNARY AMMONIUM ZWITTERIONS

BACKGROUND OF THE INVENTION

This invention relates to a process for reacting isocyanate compounds containing isocyanate moieties or active hydrogen moities in the presence of quaternary ammonium zwitterions which initiate the reaction.

Reactions of isocyanates with active hydrogen compounds such as polyols to form polyurethanes are well known as described in *Polyurethanes: Chemistry and Technology I.*, Saunders and Frisch, Interscience, pp. 66–128 (1962). Such reactions are commonly catalyzed by tertiary amines, organometallic compounds, phosphines, triazines and mixtures thereof. Such polyurethanes are usually produced of elastomers, coatings, adhesives, fibers, films and most often as flexible and rigid foams.

In the production of foams, the cellular polyurethane is made by reacting an isocyanate with polyol, generally a polyfunctional hydroxyl terminated polyether or polyester, in a formulation also containing a blowing agent and a surfactant in addition to the reactants and the catalyst. By proper choice of amounts and types of the isocyanate and polyol, foams can be made with properties ranging from flexible to semirigid to rigid. As is well known, the polyurethane foams, particularly the rigid foams, are excellent thermal insulators in a wide variety of applications, especially in the refrigerant and construction industries.

Unfortunately, the flammability and smoke evolutionary characteristics of the polyurethane foams have significantly limited the use of such foams in many applications. Conventionally, the tendency of polyurethane foam to burn is reduced by adding halogenated organic materials or combinations thereof with phosphorus compounds to the polyurethane formulation. More recently, polyurethanes having improved flame and heat resistance (hereinafter called "thermal stability") have been made by introducing more isocyanurate groups into the polyurethane. In addition to high thermal stability, polyurethanes containing such isocyanurate groups also exhibit hydrolytic and dimensional stability.

Such foams are normally produced by employing so-called trimerization catalysts in combination with conventional urethane catalysts in the urethane formulation. Exemplary trimerization catalysts include the amine catalysts such as 2,4,6-(N,N-dimethylaminomethyl)phenol; hexahydrotriazines; metal alkoxides; metal carboxylates; metal oxides; organometallics; metal chelates and combinations thereof. Unfortunately, relatively large amounts of catalysts are required to produce the trimerization needed to form isocyanurate groups, particularly in the preparation of isocyanurate foams. The presence of larger amounts of catalysts, particularly the amino or metal catalysts, often causes degradation when the resultant foam is subjected to elevated temperatures. Some catalysts, particularly the alkali metal carboxylates, yield foams which are so friable that they exhibit little, if any, resistance to impact and abrasion. More recently, as taught in U.S. Pat. No. 4,111,914, isocyanurate foams exhibiting reduced friability have been prepared from stable isocyanurate oligomers formed in the presence of sulfonium zwitterions. While such isocyanurate foams exhibit many desirable properties as compared to conventional isocyanurate foams, further improvements in reaction rates, processability, impact and abrasion resistance are desired.

In the preparation of flexible polyurethane foams wherein foaming is caused in part by carbon dioxide released from the reaction of water with isocyanate groups, a dual catalyst is required in order to obtain a foam having acceptable physical properties and/or to facilitate processing. This dual catalyst commonly consists of a tertiary amine and an organometallic compound. Due to the instability of the organometallic compound, usually a tin alkanoate such as tin octoate, these dual catalysts have to be carefully metered in separate streams in commercial foam machines. Also, the amine compounds used as one of the components of the dual catalyst are often toxic and cause undesirable odor problems.

In view of the aforementioned difficulties with the conventional catalysts employed and the reactions of isocyanates, it is highly desirable to provide a process for preparing polyurethane foams, particularly those containing substantial isocyanurate moieties, wherein such foams exhibit good thermal resistance as well as impact and abrasion resistance. In addition, it is desirable that improvements in reaction rates and processability be achieved by such process.

SUMMARY OF THE INVENTION

In its broadest aspect, the present invention is a process for reacting organic compounds, including polymers, containing at least one isocyanate moiety (hereinafter such a compound is called an "isocyanate") with (1) itself or another isocyanate or (2) an active hydrogen compound or (3) a mixture of isocyanate and active hydrogen compound in the presence of a suitable arammonium areneoxide to initiate the reaction.

With respect to the reaction of isocyanate moities, the reactions of particular interest are those wherein the isocyanate moieties of an isocyanate react with each other or with isocyanate moieties of another isocyanate (so-called isocyanate polymerization) to form partially trimerized isocyanates (isocyanurates) and other NCO-terminated isocyanurate oligomers. Of lesser interest are the reactions wherein the isocyanate reacts with itself or another isocyanate to form a trimer or other isocyanate polymer which does not contain free or unreacted isocyanate groups. In all cases, the resulting isocyanurate polymer generally has at least one ring structure (so-called isocyanurate ring) represented by the formula:

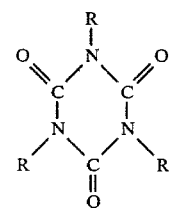

wherein R is the organic moiety of the isocyanurate. In partially trimerized isocyanates and other NCO-terminated oligomers, R contains one or more terminal or pendant NCO groups. Alternatively, reaction of isocyanate moiety with isocyanate moiety may proceed to form a linear polymer such as 1-nylon represented by the formula:

wherein R is as defined hereinbefore.

With respect to the reaction of isocyanate with active hydrogen, the isocyanate moiety or moieties of the isocyanate react with active hydrogen moieties to form urethane or urethane type linkages represented by the formula:

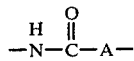

wherein A is O, S, NH or other residue of an active hydrogen moiety.

In another aspect, the present invention is a zwitterion characterized by an aromatic ring bearing an oxygen anion, an ammonium group and an organic monovalent radical having at least one carbon atom, hereinafter called a preferred ar-ammonium zwitterion. Surprising is the extremely high efficiency exhibited by the ammonium zwitterion as an initiator for most isocyanate reactions including the reaction of isocyanate with active hydrogen compound such as polyols to form polyurethanes. In addition, the ammonium zwitterion is useful as a sole initiator in the preparation of flexible polyurethane foams. Also, rigid polyurethane isocyanurate foams produced in the presence of such ammonium zwitterions tend to be less friable, i.e., more resistant to abrasion, than those foams made using conventional isocyanurate catalysts.

Accordingly, the practice of the present invention yields reaction products which are useful as foams, elastomers, fibers, coatings and the like which are similar to or better than products of conventional isocyanate reactions.

DETAILED DESCRIPTION OF ILLUSTRATIVE EMBODIMENTS

The suitable ar-ammonium zwitterions employed as initiators in the practice of this invention are characterized by an aromatic ring structure bearing an oxygen anion and an ammonium group, preferably a quaternary ammonium group. In addition, the zwitterion has sufficient hydrophobicity to render it soluble in the isocyanate. Preferably, such hydrophobicity is provided by a hydrophobic group that is a substituent of the aromatic group ring of the zwitterion. Such a hydrophobic group is a hydrocarbon containing monoradical which renders the catalysts soluble in the isocyanate. Examples of such hydrophobic groups are alkyl groups, preferably those having 4 or more carbons. More preferably, such ammonium zwitterions are those corresponding to the formulae:

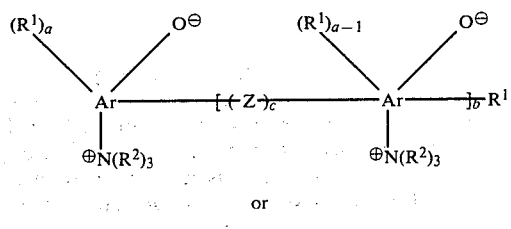

or

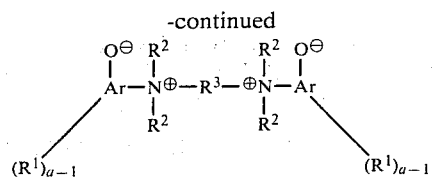

wherein each Ar is independently a cyclic aromatic polyyl; each $R^1$ is independently a suitably inert monovalent radical capable of existing as a substituent on Ar provided that at least one $R^1$ is an organic radical containing at least one carbon atom; each Z is independently a suitably inert divalent radical capable of bridging aromatic moieties such as Ar; each $R^2$ is independently a suitably inert monovalent radical and/or two or three of $R^2$ are collectively a suitably inert divalent as trivalent organic radical capable of forming a heterocyclic ring with $N^+$, e.g.,

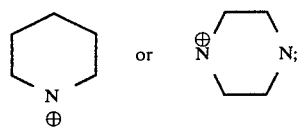

$R^3$ is a divalent organic radical; a is a positive integer corresponding to the remaining available positions on Ar; b is 0 or a positive integer from 1 to 5, preferably 0; and c is 0 or 1. In the most preferred zwitterions, the quaternary ammonium group is a ring position that is ortho to the oxygen anion.

The term "aromatic polyyl" means a polyvalent aromatic ring having at least one aromatic carbocyclic ring, for example, benzene as a polyyl has a maximum valence (sites available for substitution) of 6. More particularly, Ar is an aromatic polyyl containing at least one carbocyclic aromatic ring and therefore includes mononuclear aromatic carbocyclic polyyls such as benzene, polynuclear aromatic carbocyclic or polyyl aromatic carbocyclic/(N, O or S) heterocyclic polyyl including fused and nonfused polynuclear aromatic polyyls. A carbocyclic/(N, O or S) heterocyclic polyyl is one having at least one carbocyclic ring fused with or bonded to one or more five- or six-membered heterocyclic rings, each heterocyclic ring containing only one of N, S or O, provided that the heterocyclic ring containing —N— is a six-membered ring. Examples of suitable carbocyclic heterocyclic polyyls include polyyls of quinoline, isoquinoline, acridine, benzoquinoline, 1-azophenanthrene, benzofuran, benzothiophene and the like. Preferably, Ar is an arene polyyl, e.g., polyyls of benzene, naphthalene, anthracene, biphenyl and 1,2-diphenylethene. Especially preferred are polyyls of benzene and naphthalene, with the polyyls of benzene being more preferred.

Each $R^1$ is independently a suitably inert monovalent radical which is capable of existing as a substituent on Ar, provided that, at least one $R^1$ is a hydrophobic group as defined herein. Examples include H, X such as Cl or Br, OH, $R^4$, $—OR^4$, $—SR^4$,

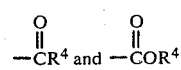

wherein R⁴ is hydrocarbyl or substituted hydrocarbyl. Hydrocarbyl is a hydrocarbon radical having from 1 to 20 carbons, preferably alkyl, cycloalkyl, alkenyl, aryl, alkylaryl, aralkyl and similar hydrocarbon radicals having 1 to 8 carbons. Exemplary substituents of substituted hydrocarbyl include X, OH, —OR⁴, —SR⁴ and the like wherein X and R⁴ are as defined hereinbefore. Preferably, R¹ is hydrogen, hydroxyl, $C_1$-$C_8$ alkoxy with hydrogen and $C_1$-$C_4$ alkyl being especially preferred. It is understood that the use of R¹ groups other than hydrogen, particularly very bulky groups such as higher hydrocarbyls and ring deactivating groups such as halogen will be limited as necessary to insure formation of a stable ar-ammonium arenol salt as well as the corresponding zwitterion.

Z is a suitably inert divalent radical capable of bridging aromatic rings each bearing a ring substituted oxide anion and an ammonium cation. Suitable examples of Z include —O—, —S—,

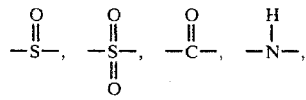

—R₅—, —OR₅O—, —SR₅S—, —R₅O—, —R₅S—,

and the like wherein R₅ is hydrocarbylene or substituted hydrocarbylene with substituents as defined for R⁴ hereinbefore. Hydrocarylene is preferably a divalent hydrocarbon radical having from 1 to 8 carbon atoms, more preferably from 2 to 4 carbon atoms. Preferred examples of Z include —S—, —O—, alkylene, alkenylene, cycloalkylene, arylene, alkylenearylenealkylene, and oxyalkyleneoxy. Especially preferred are

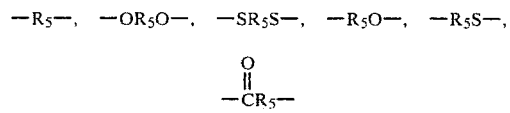

wherein m₂ is 1-4 and R⁶ is $C_1$-$C_4$ alkyl.

Individually, each R² is a suitably inert monovalent organic radical such as hydrocarbyl or substituted hydrocarbyl as set forth in the definition of R¹. Suitable examples include alkyl, aryl, cycloalkyl, alkaryl, alkylthioalkyl, alkoxyalkyl and the like. Preferred are $C_6$-$C_8$ aryl such as phenyl to tolyl or $C_1$-$C_8$ alkyl. Examples of preferred alkyls include methyl, ethyl, propyl, butyl or octyl with the most preferred being the $C_1$-$C_4$ alkyls.

The cyclic ammonium zwitterions wherein two or more R² groups are collectively a divalent radical or a trivalent radical are generally less desirable than the aforementioned acyclic ammonium zwitterions. However, in such cyclic ammoniums, two R² groups are collectively an inert, divalent organic radical that is capable of forming a heterocyclic ring with trivalent nitrogen. It is also understood that the resulting heterocyclic ring is capable of existing as a cyclic ammonium group bonded to the aromatic ring of Ar. Suitable examples of such cyclic ammonium groups include pyridinium, morpholinium,

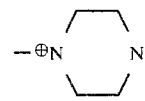

and the like.

Advantageously, R³ is hydrocarbylene, e.g., alkylene having from 2 to 12 carbons, preferably alkylene wherein the valence bonds exist on different carbon atoms. Examples of alkylene include ethylene, propylene and butylene.

Examples of preferred ammonium zwitterions include those represented by the following formulae:

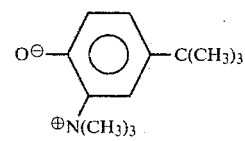

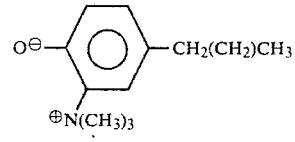

wherein x=2 to 20.

The aforementioned ammonium zwitterions are suitably prepared by first nitrating phenol or a phenol bearing a suitable hydrophobic substituent using a condition conventionally employed in the nitration of phenols. The nitrated phenol is then reduced to an amino phenol by contacting the nitrated phenol with a reducing agent such as hydrogen in presence of platinum oxide in ethanol. The aminophenol is then quaternized by contacting the aminophenol with an alkylating agent such as methyl iodide in the presence of an ion exchange resin, e.g., quaternary ammonium styrene/divinyl benzene resin in the carbonate (CO₃=) form. The resulting solution is then exchanged with the hydroxide form of the aforementioned ion exchange resin to form the desired quaternary ammonium zwitterion. Alternatively, the desired quaternary ammonium zwitterion can be prepared from purchased aminophenol by using the aforementioned quaternization and ion exchange procedures.

For the purposes of this invention, the term "isocyanate" means any compound including polymers that contain at least one isocyanate group such as monoisocyanates, e.g., those having the formula RNCO wherein R is a monovalent organic radical as defined hereinbefore, and organic polyisocyanates. Of particular interest are the organic polyisocyanates represented by the formula R(NCO)$_z$ wherein R is a polyvalent organic radical and z is an integer of 2 or more that corresponds to the valence of R. Preferably, z is 2-4, most preferably 2-3. Exemplary R include alkyl, cycloalkyl, aralkyl, aryl and other hydrocarbyl groups. Representative organic polyisocyanates suitably employed include, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; aromatic triisocyanates such as tris-(4-isocyanatophenyl)methane; 2,4,6-toluene tris(isocyanates); the aromatic tetra(isocyanates), such as 4,4'-dimethyldiphenylmethane-2,2',5',5'-tetra(isocyanate) and the like; alkylaryl polyisocyanate such as xylene diisocyanate; aliphatic polyisocyanates such as hexamethylene-1,6-diisocyanate; ethylene diisocyanate, dicyclohexyl and methane-4,4'-diisocyanate and mixtures thereof. Other organic polyisocyanates include polymethylene polyphenyl isocyanate, hydrogenated methylene diphenylisocyanate, m-phenylene diisocyanate, naphthylene-1,5-diisocyanate, 1-methoxyphenyl-2,4-diisocyanate, diphenylmethane-4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, isophorone diisocyanate, 1,3-bis-(isocyanatomethyl)benzene, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4-diisocyanatodiphenyl ether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6'-dimethyl-4,4'-diisocyanatodiphenyl and mixtures thereof. Also suitable are polyisocyanates of higher functionality such as dimers and particularly NCO-terminated oligomers of isocyanates containing isocyanate rings as well as prepolymers and mixtures of the aforementioned isocyanates. Also suitable are those sometimes referred to as quasi-prepolymers of such isocyanates prepared by reacting an excess of isocyanate with an active hydrogen compound such as a polyol, preferably those made by reacting at least 2 moles of isocyanate group with one mole of active hydrogen.

Of these polyisocyanates, the polymethylene polyphenylisocyanate isomers are more preferred especially those having an isocyanate functionality in the range from about 2.0 to about 3.2 and an equivalent weight from about 130 to about 250.

These polyisocyanates are prepared by conventional methods known in the art such as phosgenation of the corresponding organic amine.

Suitable isocyanates also include monoisocyanates such as phenol isocyanate, cresol isocyanate and the like.

Active hydrogen compounds suitably reacted with the isocyanate in the practice of this invention include any compounds including polymers containing at least one active hydrogen moiety. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, —CONH$_2$, —SH and —CONH—. Hereinafter, such compounds shall be referred to as monoahls (one active hydrogen moiety per molecule) and polyahls (two or more active hydrogen moieties per molecule).

Typical active hydrogen compounds include monools and polyols, amines including polyamines, amides including polyamides, mercaptans including polymercaptans, acids including polyacids and the like, particularly exemplified in U.S. Pat. No. 3,887,501. Examples of suitable hydroxyl compounds are the following (including mixtures thereof): monohydric alcohols such as ethanol, propanol and butanol as well as monohydric phenols such as phenol. Of particular interest are the polyols such as polyether polyols, the polyester polyols, homopolymers and copolymers of hydroxyalkyl acrylates and methacrylates, polyepoxide resins, phenol-formaldehyde resins, polyhydroxy terminated polyurethane polymers, polyhydroxyl-containing phosphorus compounds and alkylene oxide adducts of polyhydric thioethers, acetals including polyacetals, aliphatic and aromatic polyols and thiols including polythioethers, ammonium and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also, alkylene adducts of compounds which contain one —SH group and one —OH group as well as those which contain an amino group and a —SH group may be used.

Polyether polyols which are more preferably employed as the polyahl in the practice of this invention are the polyalkylene polyether polyols, e.g., diols such as ethylene glycol, propylene glycol, butylene glycol, diethylene glycol and trimethylolpropane. Exemplary alcohols that are advantageously employed in making the polyether polyol include methanol, ethanol, ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, sorbitol and other of the various alcohols mentioned in U.S. Pat. No. 3,928,299. Also included within the term "alcohol" are compounds derived from phenol such as 2,2-(4,4'-hydroxyphenyl)propane, commonly known as bisphenol A; sugars such as sucrose, glucose and fructose and the like. Illustrative alkylene oxides that are advantageously employed in the preparation of the polyether polyol include ethylene oxide, propylene oxide, butylene oxide, amylene oxide and random or block copolymers of two or more of these oxides; glycidol; glycidyl ethers or thioethers such as methyl glycidyl ethers, t-butyl glycidyl ether and phenyl glycidyl ether. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,973; 3,058,921; 2,871,219 and British Pat. No. 898,306. Polyether polyols which are most preferred include diethylene glycol, dipropylene glycol and other polyalkylene glycols having weight average molecular weight ($M_w$) up to about 6000 including glycerine initiated polyethers of ethylene oxide and/or propylene oxide having $M_w$ in the range from about 2200 to about 6000 and sucrose initiated polyethers of ethylene oxide and/or propylene oxide having $M_w$ in the range from about 300 to about 1500.

The polyester polyols, which are as preferred as the polyether polyols, are reaction products of polycarboxylic acids and alcohols particularly polyhydric alcohols. Of particular interest are the polyoxyalkylene esters such as the polyoxyethylene esters and the polyoxypropylene esters. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid and 1,4-cyclohexane-dicarboxylic acid. Any suitable alcohol including both aliphatic and aromatic may be used. Examples of suitable alcohols are those polyhydric alcohols described hereinbefore. Also included with the term "polyhydric alcohol" are compounds derived from phenol such as 2,2-(4,4'-hydroxyphenyl)propane, commonly known as bisphenol A; polyacetone polyols and the like.

Other polyahls suitably employed include polyalkylene polyamines such as ethylenediamine; amino alcohols such as amino ethanol; esters of phosphoric, sulfonic and boric acids; cellulose-like polymers such as starch and methyl cellulose; peptides and polypeptides; methylol resins such as urea-formaldehyde and melamineformaldehyde; lactone polyols prepared by reacting a lactone such as ε-caprolactone or a mixture of ε-caprolactone and an alkylene oxide with a polyfunctional initiator such as a polyhydric alcohol, an amine or an amino alcohol; the polymer/polyols produced by the in situ polymers of a vinyl monomer in a polyol; as disclosed in U.S. Pat. Nos. 3,304,273; 3,383,351 and 3,523,093.

Of the foregoing polyahls, the polyalkylene ether diols such as ethylene glycol, diethylene glycol, triethylene glycol, ethoxylated glycerin, polyether diols of ethylene oxide and/or propylene oxide having $M_w$ up to 1000 are more preferred with diethylene glycol being most preferred.

Also suitable active hydrogen compounds are those containing one active hydrogen moiety such as alcohols, e.g., methanol, ethanol, propanol, butanol and decanol; phenols such as phenol and xylenenol; water; ammonia; primary and secondary amines such as methylamine and dimethylamine and the like. Employment of water as a portion of the active hydrogen component is of particular interest in the manufacture of flexible polyurethane foams wherein the water reacts with a portion of the isocyanate to form urea and carbon dioxide. The carbon dioxide serves as a blowing agent needed to form the foam. Accordingly, an exemplary polyurethane formulation for making such a foam would include water, a polyol, a suitable isocyanate and the ammonium zwitterion.

The particular isocyanate and active hydrogen compound as well as quantities thereof to be employed in the practice of this invention depend upon the particular end use application desired. Such choices are within the skill of the art to which such end use is directed. Such choices are described in *Polyurethanes: Chemistry and Technology*, II., Saunders and Frisch, Intersciences (1964). Similarly, there are described procedures useful for other isocyanate reactions as well as other ingredients that may be employed. For example, the reaction of isocyanate to form carbodiamide is described at page 93 of Saunders and Frisch, supra, and 1-nylon resulting from the homopolymerization of isocyanate is described at page 99 of Saunders and Frisch, supra. Accordingly, the ammonium zwitterion can be employed as initiator for isocyanate reactions according to the procedures and under the conditions described in Saunders and Frisch, supra, which is hereby incorporated by reference in its entirety.

Foams and the like contain both urethane and isocyanurate linkages and their methods of preparation are described in U.S. Pat. Nos. 3,516,950 and 3,723,367. Such methods of practice can be generally employed in the practice of this invention wherein the ammonium zwitterion is employed as part or all of the initiator.

The quantity of ammonium zwitterion to be employed is that quantity necessary to initiate the reaction so as to produce the desired reaction product. In general, such quantities include, for example, from about 0.005 to about 0.05 mole of ammonium zwitterion per mole of isocyanate moiety, preferably from about 0.01 to about 0.03 mole of ammonium zwitterion per mole of isocyanate moiety. In the preparation of isocyanurates, the quantity of ammonium zwitterion is preferably from about 0.001 to about 0.02 mole of ammonium zwitterion per mole of isocyanate moiety. On the other hand, rigid polyurethane foams are most advantageously prepared using from about 0.005 to about 0.05, preferably from about 0.01 to about 0.03, mole of zwitterion per mole of isocyanate moiety. As will be noted by those skilled in the art of isocyanate reactions, significantly lesser quantities of the ammonium zwitterion are required to initiate the desired isocyanate reaction than are required of conventional urethane catalysts.

In addition to the previously disclosed isocyanate, active hydrogen, and ammonium zwitterion, other ingredients such as cocatalysts, surfactants and blowing agents are often advantageously included. Exemplary cocatalysts are the metal carboxylates wherein the metal is alkali metal such as lithium, sodium or potassium or an alkaline earth method such as calcium, magnesium and the like and the carboxylate is a derivative of a carboxylic acid containing 1 to 20 carbon atoms. Examples of such carboxylates include acetate, propionate, butyrate, valerate, hexanoate, heptanoate and other saturated acids containing up to 20 carbon atoms; unsaturated carboxylates derived from animal fats such as oleate or linoleate; polycarboxylates such as oxalate, malenate, succinate, terephthalate and the like. Of the foregoing metal carboxylates, the alkali metal salts of lower aliphatic carboxylates such as potassium acetate as well as quaternary ammonium carboxylates such as tetramethyl ammonium acetate are preferred, with potassium acetate being especially preferred. When employed, the metal carboxylate is employed in an amount sufficient to accelerate the formation of isocyanurate as compared to the use of the ammonium zwitterion alone. Preferably, the metal carboxylate is employed in an amount from about 2 to about 5 weight parts of zwitterion per weight part of carboxylate, more preferably from about 2.5 to about 4.0 weight parts of zwitterion per weight part of carboxylate.

Blowing agents suitably employed include those characteristically used in the preparation of rigid polyurethane foams and are, in general, liquids having a blowing point between −50° C. and +100° C., preferably between 0° C. and 50° C. Examples of such blowing agents include chlorinated and fluorinated hydrocarbons such as fluorotrichloromethane, 1,1,2-trichloro-1,2,2-trifluoroethane, and 1,1-dichloro-1,2,2,2-tetrafluoroethane, methylene chloride, ethylene chloride, dichlorodifluoromethane and the like, with trichlorofluoromethane being preferred. As mentioned before, water may also be used to generate carbon dioxide as a supplemental blowing agent in combination with the aforementioned halohydrocarbons. The use of water in this manner is described by Saunders and Frisch in *Advances in Polyurethane Chemistry,* Technomic Publishing Co., Vol. I,. 76(1971). The blowing agents are employed in amounts sufficient to give the resulting foam the desired bulk density, generally from about 1.2 to about 3 lbs/ft$^2$. Accordingly, the blowing agent preferably constitutes from about 10 to about 18, most preferably from about 12 to about 15, weight percent of the formulation.

Surfactants advantageously employed include reaction products of polysiloxanes and alkylene oxides such as ethylene oxide and propylene oxide, e.g., polydimethylsiloxanes, polyoxyalkylene block copolymers, alkoxysilanes, polysilylphosphinates, and the like. Other examples of surfactants include block copolymers of polysiloxane and polyalkylene oxide, alkylaryl siloxanes, and other organosilicons. The surfactant is normally employed in an amount sufficient to stabilize bubbles resulting from the blowing agent until the foam has achieved sufficient strength to avoid collapse. Preferably, such surfactants are employed in amounts from about 0.5 to about 2, more preferably from about 0.5 to about 1, weight percent based on the weight of the entire foam formulation.

In addition to the aforementioned ingredients of the foam formulation, other substances such as conventional catalysts include the tertiary amines and organometallic catalysts, fillers, dyes, pigments, cross-linking agents, chain extenders, flame retarding agents and smoke suppressing agents may be employed in a manner similar to their use in conventional urethane and polyurethane products.

In carrying out the process of this invention, it is preferable to dissolve the ammonium zwitterion in a suitable solvent prior to contacting it with isocyanate. Exemplary solvents are those materials that (1) dissolve an appreciable amount of the zwitterion, e.g., at least enough to provide a 0.01 weight percent solution of the zwitterion and (2) do not react with the zwitterion. Advantageously, such solvents are aliphatic nitriles such as acetonitrile; polyols such as ethylene glycol, diethylene glycol, propylene glycol, dipropylene glycol and the like; alcohols such as methanol, ethanol and cyclohexanol; and similar materials. Advantageously, the zwitterion and solvent are combined to form 10 to 35 weight percent solutions of the zwitterion. In the preparation of NCO-terminated oligomers or prepolymers, the zwitterion concentration in the solution is advantageously from about 10 to about 20 weight percent. In the preparation of polyurethanes, the zwitterion concentration is advantageously from about 0.1 to about 30 weight percent.

In the preparation of the NCO-terminated oligomers or prepolymers, it is particularly advantageous to form the oligomer by a reverse addition technique wherein the isocyanate is added slowly to a solution of catalyst. Otherwise, in the practice of this invention, the order of addition of reactants and initiators is not particularly important and conventional techniques are employed. Such techniques and procedures used to prepare the foams and other products of the present invention are suitably described in U.S. Pat. Nos. 3,516,950, 4,111,914 and 3,723,367. Accordingly, conventional temperatures and pressures are employed in the process which may range from about −100° to about 130° C., generally from about −100° to about 100° C., at atmospheric to above atmospheric pressure as well as below atmospheric pressure. Generally, the most advantageous temperatures and pressures are those at which the ammonium zwitterion is relatively stable and the reactants are generally soluble in the desired reaction solvent.

In the practice of the preferred embodiment wherein the aforementioned ammonium zwitterion and metal carboxylate are employed in combination as the initiator, the zwitterion and carboxylate are dissolved in a suitable solvent to form from about 20 to about 30 weight percent solution of zwitterion and from about 20 to about 30 weight percent solution of carboxylate. The resulting solution of zwitterion and carboxylate is then combined with the other reagents of the formulation except for the isocyanate. The resulting combination is agitated rapidly to insure an essentially homogeneous mixture. This mixture is then thoroughly blended with the isocyanate after which it is poured into a suitable mold or other container wherein simultaneous polymerization and expansion or blowing occurs.

The following examples are given to illustrate the invention and should not be construed as limiting its scope. Unless otherwise indicated, all parts and percentages are by weight.

EXAMPLE 1

Preparation of Ammonium Zwitterion

To a solution of 310 g of acetic acid and 262 g (1 mole) of 4-dodecyl phenol maintained at 20° C. is slowly added with stirring 76 ml (1.2 moles) of HNO$_3$ in 40 ml of water. After 30 minutes, ice water (800 ml) is added to the reaction vessel and the resulting mixture is extracted with methylene chloride. The methylene chloride phase is withdrawn and washed successively with water, an aqueous solution of NaHCO$_3$ (5 percent) and water. The methylene chloride is then removed under vacuum to obtain the desired 2-nitro-4-dodecyl-phenol. A solution of 46 g (0.15 mole) of the nitrated phenol, 550 ml of absolute ethanol and 1.2 g of platinum oxide is maintained at 20° C. under 50 psi of hydrogen for 23 hours. The reaction mixture is filtered and then subjected to vacuum to remove solvent. Essentially quantitative yield of the desired 2-amino-4-dodecyl-phenol is recovered. A solution of 200 ml of acetone, 200 ml of water and 38.8 g (0.14 mole) of the amino phenol is stirred with 200 ml of a carbonate form (CO$_3$=) quaternary ammonium styrene/divinyl benzene, ion exchange resin sold by The Dow Chemical Company under the trade name, Dowex ® SBR, forty-nine ml (0.787 mole) of methyl iodide is added to the aforementioned solution through a dry ice condenser. After refluxing the reaction mixture with stirring for 20 hours, the mixture is filtered and excess methyl iodide is removed under vacuum. The resulting solution is contacted with the hydroxide form of the aforementioned ion exchange resin to provide the desired quaternary ammonium zwitterion.

An isocyanurate foam formulation is prepared by combining 35.9 g of diethylene glycol, 10 g of an epoxy resin based on bisphenol A and epichlorohydrin and sold by The Dow Chemical Company under the trade designation D.E.R. ® 330 epoxy resin, 3 g of a silicone surfactant sold by Dow Corning under the trade designation DC 193, 2 g of an ammonium zwitterion represented by the formula:

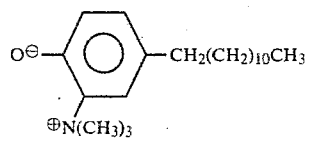

4-dodecyl-2-(trimethylammonio)phenoxide, 1 g of potassium acetate and 40 g of trichlorofluoromethane. These components are mixed together for 1 minute on a high shear mixer and then 280 g of polymethylene polyphenyl isocyanate having a functionality of 2.6 and an equivalent weight of 133 is added to the formulation. The resulting formulation is mixed for 5 seconds on the mixer and then poured into a container. At room temperature, the foam rises and is tack free to the touch in 11 seconds. The foam (Sample No. 1) is removed from the container and is tested for physical properties and insulative properties. Results of these tests are reported in Table I. For the purpose of additional illustration of the invention, several different formulations (Sample Nos. 2–9) are prepared using different ammonium zwitterion initiators are well as other different conditions as specified in Table I. The results of these runs are also reported in Table I.

An additional formulation (Sample No. A) is prepared which is similar to Sample No. 1 except that the ammonium zwitterion is 4-trimethylammonium phenate (TMP) represented by the formula:

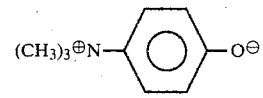

and 50 grams of trichlorofluoromethane is employed. The formulation is mixed in a manner similar to the foregoing procedure and allowed to cure. The results are reported in Table I.

For the purpose of the comparison, several formulations are prepared using known catalysts or initiators in the above formulation. These formulations are also foamed and tested according to the aforementioned procedures. The results of these tests are also reported in Table I.

TABLE I

| Sample No. | Initiator (1) Type | Amt., Wt % | Coinitiator (2) Type | Amt., Wt % | Tack Free Time (3), Sec. | Density (4), lbs/ft$^3$ | Friability (5), % wt loss | Compressive Strength (6), lbs/in$^2$ | K Factor (7) Btu/-ft$^2$/in/°F./hr |
|---|---|---|---|---|---|---|---|---|---|
| 1 | C$_{12}$AZ | 2 | KAc | 1 | 11 | 1.93 | 30 | 27.1 | 0.130 |
| 2 | " | 2 | " | 0.5 | 14 | 2.01 | 16 | 26.5 | 0.117 |
| 3 | " | 1 | " | 1 | 20 | 1.9 | 43 | 32.2 | 0.133 |
| 4 | " | 1 | " | 0.5 | 34 | 1.99 | 27 | 26.8 | 0.129 |
| 5 | " | 3 | " | 1 | 7 | 1.93 | 27 | 25.4 | 0.124 |
| 6 | " | 3 | " | 1.5 | 6.5 | 2.08 | 48 | 30.3 | 0.130 |
| 7 | " | 3 | " | 0.5 | 12 | 1.92 | 17 | 26.7 | 0.118 |
| 8 | SC$_4$AZ | 1 | " | 2 | 14 | 1.83 | 41.9 | 27.7 | 0.188 |
| 9 | C$_9$AZ | 2 | " | 1 | 33 | 2.03 | 62.5 | 29.5 | 0.145 |
| 10 | C$_9$AZ | 4 | " | 1 | 14 | 2.11 | 54.5 | 34.5 | 0.136 |
| 11 | TC$_4$AZ | 2 | " | 1 | 16 | 1.85 | 22.8 | 28.5 | 0.127 |
| C$_1$* | CO$_2$AZ(a) | 2.0 | " | 1 | 65 | 1.84 | 49.2 | 28.5 | 0.265 |
| C$_2$* | CO$_2$AZ(b) | 2.0 | " | 1 | 65 | 2.13 | 64.5 | 27.7 | 0.151 |

TABLE I-continued

| Sample No. | Initiator (1) Type | Amt., Wt % | Coinitiator (2) Type | Amt., Wt % | Tack Free Time (3), Sec. | Density (4), lbs/ft³ | Friability (5), % wt loss | Compressive Strength (6), lbs/in² | K Factor (7) Btu/-ft²/in/°F./hr |
|---|---|---|---|---|---|---|---|---|---|
| A* | TMP | 2.0 | " | 1 | 55 | Foam has physical properties too poor to measure | | | |

*Not an example of the invention.

(1) C₁₂AZ—O⁻
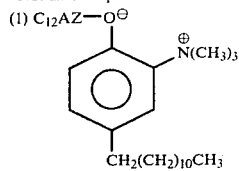

SC₄AZ—O⁻
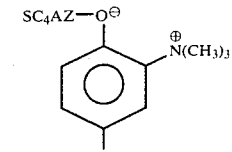

C₉AZ—O⁻
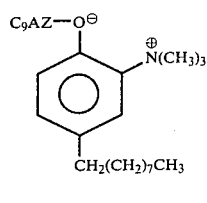

TC₄AZ—O⁻
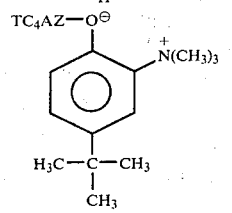

CO₂AZ(a) CO₂⁻
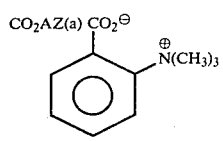

CO₂AZ(b) CH₂=CH—N⁺(CH₃)—CH₂CO₂⁻
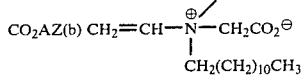
CH₂(CH₂)₁₀CH₃

TMP
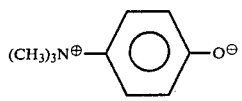

Weight percent of zwitterion based on weight of entire formulation.
(2) KAc - potassium acetate wherein weight percent of the KAc is based on the entire formulation.
(3) Time in seconds until foam becomes non-tacky to human touch
(4) ASTM D-1622
(5) ASTM C-421
(6) ASTM D-1621
(7) ASTM C-518

As evidenced by the data shown in Table I, the ammonium zwitterions of this invention yield polyisocyanurate foams in shorter times than do other ammonium zwitterions.

EXAMPLE 2

A formulation of 100 g of a sucrose initiated polypropylene polyol having a weight average molecular weight ($M_w$) of 360, 1 g of a silicone surfactant sold by Dow Corning under the trade designation DC 190, 1 g of 4-dodecyl-2-(trimethyl-ammonio) phenoxide, and 50 g of trichlorofluoromethane is blended on a high shear mixer and then mixed with 84 g of the polymethylene polyphenyl isocyanate used in Example 1. The resulting mixture reacts to form a rigid polyurethane foam.

A formulation of 100 g of a glycerine initiated polypropylene polyol having a $M_w$ of 3000, 3.3 g of water, 1.0 g of the aforementioned silicone surfactant and 1.0 g of the aforementioned ammonium zwitterion is blended on a high shear mixer and then mixed with 42.3 g of toluene diisocyanate (80 percent, 2,4-isomer, 20 percent, 2,6-isomer). The resulting mixture reacts to form a flexible polyurethane foam.

What is claimed is:

1. A process for reacting an organic isocyanate with itself or another organic isocyanate which process comprises contacting an organic isocyanate or a mixture of organic isocyanates with an ar-ammonium zwitterion which is soluble in the isocyanate under conditions such that the ammonium zwitterion initiates the reaction of the isocyanate moieties of the organic isocyanate or mixture of organic isocyanates.

2. The process of claim 1 wherein the isocyanate moieties react to form isocyanurate moieties.

3. A process for reacting an organic isocyanate with an active hydrogen compound which process comprises contacting the isocyanate with the active hydrogen compound in the presence of an ar-ammonium zwitterion, which is soluble in the isocyanate under conditions such that the ammonium zwitterion catalyzes the reaction of the active hydrogen compound with the isocyanate.

4. A process of claim 2 or 3 wherein the ammonium zwitterion is characterized by an aromatic ring bearing an oxygen anion and a quaternary ammonium group.

5. The process of claim 4 wherein the aromatic ring also bears a monovalent organic radical having at least one carbon atom.

6. The process of claim 5 wherein the ammonium zwitterion is represented by one of the formulae:

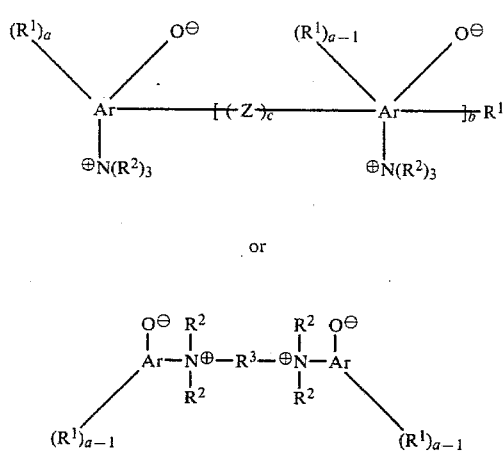

or wherein each Ar is independently a cyclic aromatic polyyl; each $R^1$ is independently a suitably inert monovalent radical capable of existing as a substituent on Ar provided that at least one $R^1$ is an organic radical containing at least four carbon atoms; each Z is independently a suitably inert divalent radical capable of bridging aromatic moieties such as Ar; each $R^2$ is independently a suitably inert monovalent radical and/or two or three of $R^2$ are collectively a suitably inert divalent or trivalent organic radical capable of forming a heterocyclic ring with $N^+$.

7. The process of claim 6 wherein the ammonium zwitterion is represented by the formula:

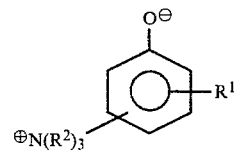

wherein $R^1$ is alkyl having from 4 to 20 carbons and each $R^2$ is individually alkyl having from 1 to 10 carbons.

8. The process of claim 7 wherein the ammonium zwitterion is

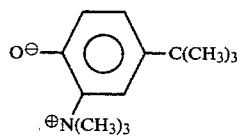

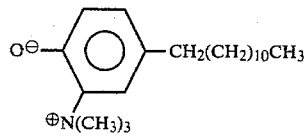

9. The process of claim 2 or 3 wherein the organic isocyanate is an organic polyisocyanate represented by the formula $R(NCO)_z$ wherein R is a polyvalent organic radical and z is an integer of 2 or more that corresponds to the valence of R.

10. The process of claim 7 wherein the organic isocyanate is a polymethylene polyphenyl isocyanate.

11. The process of claim 3 wherein the active hydrogen compound is a polyol and the isocyanate reacts with the polyol to form urethane moieties.

12. A polyurethane formulation comprising a polyol, an organic polyisocyanate and the ammonium zwitterion of claim 1.

* * * * *